US010621020B2

(12) United States Patent
Joshi et al.

(10) Patent No.: US 10,621,020 B2
(45) Date of Patent: Apr. 14, 2020

(54) PREDICTIVE SELF-HEALING ERROR REMEDIATION ARCHITECTURE

(71) Applicant: Accenture Global Solutions Limited, Dublin (IE)

(72) Inventors: Sarang Padmakar Joshi, Maharashtra (IN); Mihir Nanal, Maharashtra (IN)

(73) Assignee: Accenture Global Solutions Limited, Dublin (IE)

( * ) Notice: Subject to any disclaimer, the term of this patent is extended or adjusted under 35 U.S.C. 154(b) by 194 days.

(21) Appl. No.: 15/814,017

(22) Filed: Nov. 15, 2017

(65) Prior Publication Data

US 2019/0146861 A1    May 16, 2019

(51) Int. Cl.
*G06F 11/00* (2006.01)
*G06F 11/07* (2006.01)
*H04L 12/24* (2006.01)

(52) U.S. Cl.
CPC ........ *G06F 11/0709* (2013.01); *G06F 11/079* (2013.01); *G06F 11/0784* (2013.01); *G06F 11/0793* (2013.01); *H04L 41/0672* (2013.01); *H04L 41/16* (2013.01); *G06F 2201/815* (2013.01)

(58) Field of Classification Search
CPC .................. G06F 11/0709; G06F 11/3006
See application file for complete search history.

(56) References Cited

U.S. PATENT DOCUMENTS

| | | | |
|---|---|---|---|
| 7,702,863 B1 * | 4/2010 | Kiselev | G06F 11/1435 711/161 |
| 9,092,801 B2 | 7/2015 | Chang et al. | |
| 10,048,996 B1 * | 8/2018 | Bell | G06F 11/0709 |
| 2003/0065712 A1 * | 4/2003 | Cheung | H04L 29/06 709/203 |
| 2008/0222640 A1 | 9/2008 | Daly et al. | |
| 2013/0159787 A1 * | 6/2013 | Yingling, Jr. | G06F 11/008 714/47.3 |

(Continued)

OTHER PUBLICATIONS

Examination Report No. 1, issued in Australian Patent Application No. 2018264009, dated Apr. 18, 2019, pp. 1-4, IP Australia, Phillip, Australia.

*Primary Examiner* — Philip Guyton
(74) *Attorney, Agent, or Firm* — Brinks Gilson & Lione

(57) ABSTRACT

Systems and methods for remediating errors in distributed computing are provided. A system may include a remediation node. The remediation node may forecast receipt of a service request by a service authority. The service request may be configured to cause the service authority to modify a service assigned to an account. The service authority may be in communication with a plurality of source systems. The remediation node may acquire, from at least one of the source systems, a service parameter in which the service authority is configured to access to process the service request. The remediation node may determine an error condition corresponding to the service parameter. The remediation node may communicate, in response to determination of error condition, a remediation instruction to the at least one of the source systems, the remediation instruction configured to cause the at least one of the source systems to modify the service parameter.

18 Claims, 8 Drawing Sheets

(56) References Cited

U.S. PATENT DOCUMENTS

| | | | |
|---|---|---|---|
| 2013/0304798 A1* | 11/2013 | Chang | G06F 9/54 |
| | | | 709/203 |
| 2014/0113600 A1* | 4/2014 | El Gamal | H04W 28/16 |
| | | | 455/414.3 |
| 2015/0040134 A1 | 2/2015 | Leggette et al. | |
| 2017/0060656 A1* | 3/2017 | Bhattacharya | G06F 11/079 |
| 2018/0165185 A1* | 6/2018 | Boshev | G06F 11/3692 |

* cited by examiner

PREDICTIVE SELF-HEALING ERROR REMEDIATION ARCHITECTURE

TECHNICAL FIELD

This disclosure relates to distributed computing systems and, in particular, to managing errors in distributed systems.

BACKGROUND

Infrastructure used to provide, process, or manage services may include distributed systems working in concert. Wireless service providers, for example, may utilize distributed systems to process requests made by users and/or machines to create, modify, remove, and/or otherwise provide services to devices. In many examples, the information used to manage the services provided by service providers is distributed between nodes. In many circumstances, the data stored in a distributed system and/or the functionality provided by a distributed system may become compromised due to human, machine, and/or integration error. The errors may be difficult or computationally expensive to detect. Alternatively or in addition, current approaches to detecting, remediating, and managing the errors may suffer from a variety of drawbacks, limitations, and disadvantages.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
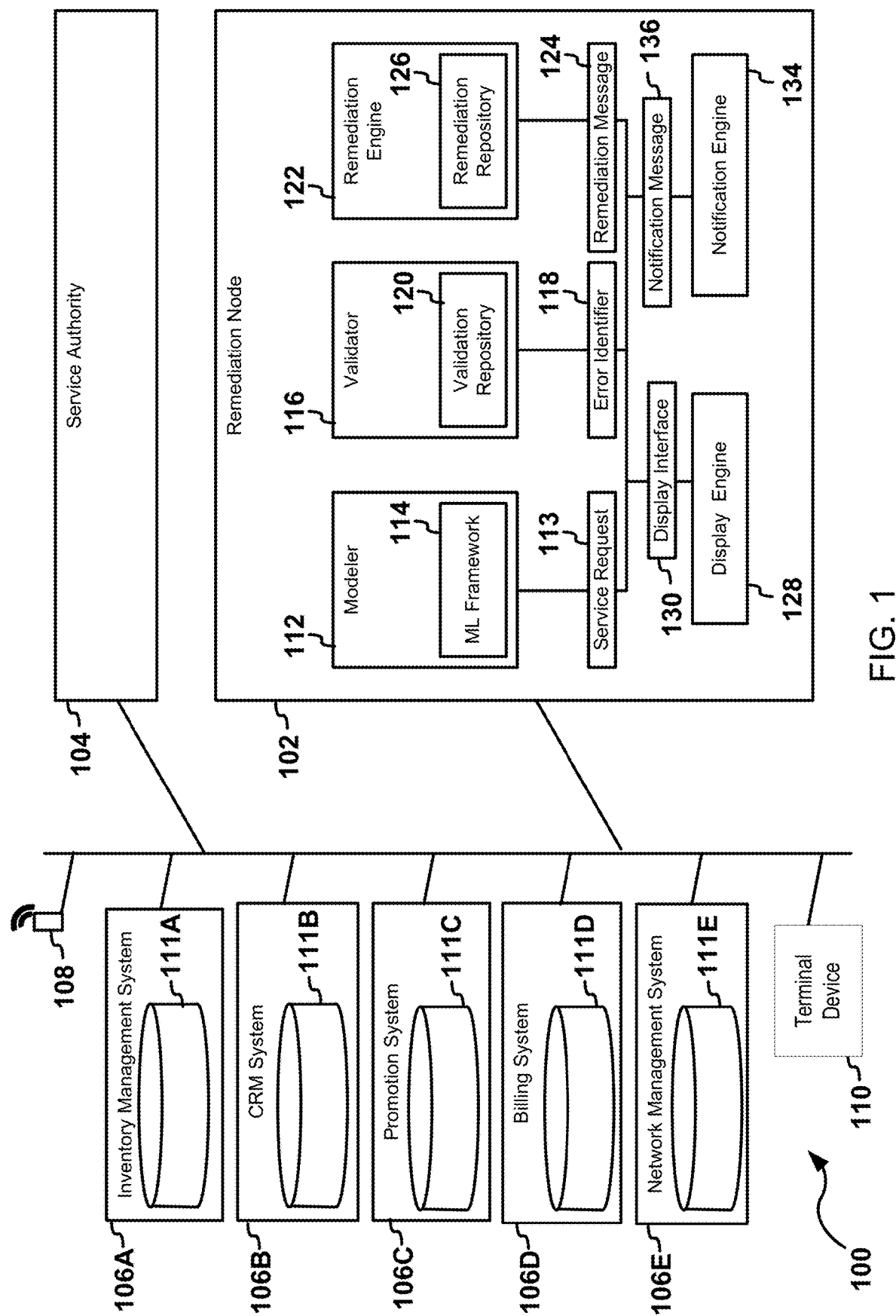
FIG. 1 illustrates a first example of a system for remediating errors in distributed computing.

By way of an introductory example, a system may include a remediation node. The remediation node may forecast receipt of a service request by a service authority. The service request may cause the service authority to modify a service assigned to an account. The service authority may be in communication with a plurality of source systems. The remediation node may acquire, from at least one of the source systems, a service parameter which the service authority accesses to process the service request. The remediation node may determine an error condition corresponding to the service parameter. The remediation node may communicate, in response to determination of the error condition, a remediation instruction to the at least one of the source systems. The remediation instruction is configured to cause the at least one of the source systems to modify the service parameter.

One interesting feature of the system and methods described below may be that interactions with a service authority and/or resultant errors may be forecasted. Errors that occur in response to the service authority managing services may be detected and remediated before the errors are actually manifested. The technical effect achieved by the systems and methods described below may be that the computer speed of the wireless authority in managing services may be improved as errors are detected and remediated ahead of time. Alternatively or in addition, the technical effect achieved by the systems and methods described below is that data reliability and integrity may be improved across multiple distributed systems. Alternatively or in addition, the user experience with the service managed by the service authority may be improved as the user may experience less erroneous information and faster processing times.

Another interesting feature of the systems and methods describe below may be that error remediation may be prioritized based on the forecasted activity of the wireless authority. A technical effect achieved by the systems and method described below may be that errors may be efficiently remediated based on those errors that are most likely to occur first. Accordingly, the processing time for remediating errors most likely to occur first may be drastically improved. In addition, the overall rate of errors may be improved as the most likely triggers of errors are predicted and the errors are remediated before they occur.

Another interesting feature of the systems and methods described below may be that information used to forecast and/or remediate errors and/or error conditions encountered by the wireless authority may be continuously improved. For example, machine learning models and instructions used to remediate errors and/or error conditions may be improved in response to monitoring the activity of the wireless authority or other systems in communication with the wireless authority. Additional benefits, efficiencies, and improvements over existing market solutions are made evident in the systems and methods described below.

FIG. 1 illustrates a first example of a system 100. The system 100 may include a remediation node 102, which may communicate with a service authority 104, one or more source systems 106A-E, a service consumer device 108, and/or a terminal device 110.

The remediation node 102 may communicate with the service authority 104, the source systems 106A-E, the service consumer device 108 and/or the terminal device 110 to detect, receive, and/or access information communicated to or from the service authority 104, the one or more source systems 106A-E, the service consumer device 108 and/or the terminal device 110. The remediation node 102 may, among other features described herein, identify an error condition related to the creation, modification, and/or removal of services managed by the service authority 104 before the error corresponding to the error condition occurs. Alternatively or, in addition, the remediation node 102 may perform remediation action(s) to resolve the error condition before the error occurs.

The service authority 104 may manage a service. Although described herein as a service, the service may be any number of different dependently or independently functioning services. The service may include any automated process that accesses data and uses the accessed data to administer a set of products, features, and/or content offered by a machine, network, organization, infrastructure, and/or one or more personnel. The service authority 104 my administer the service, manage billing for the service, manage inventory for the service, manage marketing for the service, manage customer support for the service, and/or manage any other aspect of the service. For example, the service authority 104 may include one or more computing systems for a wireless service provider. The computing systems of the wireless service provider may for example, manage communications, billing, promotions of new products, customer relationship management, and/or inventory management of wireless devices.

The service authority 104 may coordinate functionality provided by the source systems 106A-E to create, enable, disable, and/or manage any aspect of the service. As illustrated in FIG. 1, the service authority 104 may be separate from the source systems 106A-E. In other examples, the source systems 106A-E may include the service authority 104. Alternatively, the service authority 104 may include one or more of the source systems 106A-E.

In some examples, the service may be associated with a service consumer device 108. For example, the service may include providing communications, content, and/or other features to the service consumer device 108. In one example, the service may include wireless service. The wireless service may be provided to or associated with the consumer device 108. Wireless service, as described herein, refers to any services related to enabling communications over a network. For example, the wireless service may include operation of network infrastructure, billing processes, and network usage monitoring. In some examples, the wireless service may refer to voice, data, text, 3G, 4G LTE, or any other type of communication services provided to service consumer devices. Alternatively or in addition, the wireless service may refer to processes involved in enabling and maintaining communication of the service consumer device 108.

A source system may include any system configured to store, manage, and/or process information related to or used by a service. As shown in the example illustrated in FIG. 1, the source systems 106A-E may include, for example, an inventory management system 106A, a customer relationship management (CRM) system 106B, a promotion system 106C, a billing system 106D, and/or a network management system 106E. In other examples, the source system may be any other system involved in managing any aspect of a service. Alternatively or in addition, the source systems 106A-E may include the remediation node 102, and/or the service authority 104.

The source systems 106A-E may include source repositories 111A-E. A source repositories may be a hardware data storage device that includes a database, memory, and/or any kinds of data structure configured to store service parameters. The source repositories 111A-E may each store an independent set of service parameters. In some examples, a first set of service parameters stored by a first source repository may differ from a second set of service parameters stored by a second source repository. Alternatively or in addition, the first source repository may include some or all of the same service parameters as the second source repository. Each of the source systems 106A-E may independently or cooperatively manage one or more of the source repositories 111A-E and/or sets of service parameters.

Overlap or duplication of service parameters stored in the source systems 106A-E may improve data retrieval and/or data availability. Alternatively or in addition, the overlap of the service parameters may be a result of integration of data from multiple independently developed systems. As operations originating from human and/or automated processes are performed in the source systems 106A-E, errors related to the service parameters may develop within one or more of the source systems 106A-E. For example, if a human or machine error causes the MSISDN stored in the billing system 106D to differ from the MSISDN stored in the network management system 106E, an error condition may result. The error condition may manifest an error which negatively affects service provided to the service consumer device 108. Alternatively or in addition, service parameters stored by one or more of the source systems 106A-E may become obsolete, corrupted, hacked, or otherwise compromised. In some circumstances, it may be inefficient to comb the service parameters stored on each of the source systems 106A-E. Accordingly, the processing time for finding and remediating error conditions may be improved as the system can identify the errors that are most likely to occur and target the corresponding error conditions that cause the errors. In addition, the speed and throughput of the service authority 104 may be improved because errors that slow the system down are strategically remediated ahead of time. Further, the network speed and throughput between the service authority 104 and the source systems 106A-E is improved during peak times as less network traffic is dedicated to responding to errors.

In some examples, the remediation server 102 may detect and remediate error conditions, as described herein, during non-peak network traffic hours. For example, the remediation engine 102 may be configured to detect and remediate error conditions during a time window. The time window may correspond to a time period where traffic between the wireless authority and the source systems 106A-E is minimal, and/or other non-overlapping time windows. In some examples, the remediation server 102 may monitor activity of the service authority 104 to determine the time window.

The service parameters may include any data related, utilized by, or accessed to provide a service. For example, the service parameters may include information that the service authority 104 uses when starting, stopping, modifying, or otherwise administering the service. In some examples, the service parameters may include information related to the hardware of the service consumer device 108 and/or information organized in one or more accounts related to the service consumer device 108. Alternatively or in addition, the service parameters may include data related to the billing, customer relation management, marketing promotions, and/or any other aspect of the service. Table 1 lists examples of service parameters for wireless service.

TABLE 1

Wireless Service Parameter Examples

| | |
|---|---|
| Service Parameters | MSISDN, SIM Number, ESN number, service start dates, service end dates, and/or any other information related to service. |
| Hardware Parameters | PCB numbers, Radio numbers, and/or any other identifier of hardware or service. |
| Account Parameters | User names, user addresses, user contact information, login times, and/or any other information related to an account of a user. |
| Billing Parameters | Billing due dates, amounts, payment dates, rates, and/or any other information related to billing for service. |
| Product Catalogue Parameters | Hardware and services available by a service provider. |
| Service Level Details | Wireless service plans and/or tiers of service available for service consumer devices. |

TABLE 1-continued

Wireless Service Parameter Examples

| | |
|---|---|
| Usage Parameters | Usage information associate with a service consumer device including, for example, data usage, voice usage, text usage, and/or type of wireless usage. |
| Promotions Parameters | Information related to promotions related to hardware and services, including, for example, discounts, rebates, and rewards. |
| Device launch parameters | Information related to commercial availability of service consumer devices. |

The examples listed in Table 1 are non-limiting examples of service parameters and are not intended to limit other examples of service parameters. The service parameters may additionally include time information corresponding to service events. For example, the service parameters may include a time that a device expected to launch. Alternatively or in addition, the service parameters may include a time when a billing cycle starts or ends, a time when a SIM (subscriber Identity Module) card expires, a time when a service plan launches or becomes unavailable, and/or any other example of a release or expiration of hardware or services.

The remediation node 102 may include a modeler 112. The modeler 112 may receive and/or store the service parameters. The modeler 112 may analyze the service parameters to forecast a service request 113 based on the service parameters. For example, the modeler 112 may determine, based on the expiration date of a SIM, or any other kind of event related to service, that the service associated with the service consumer device 108 may be modified. Alternatively or in addition, the modeler 112 may evaluate historical changes made to an account related to the service consumer device 108 to forecast the service request 113. For example, the modeler 112 may determine that the account regularly makes requests to increase the data limit for a monthly wireless billing cycle. Alternatively or in addition, the modeler 112 may forecast the service request 113 based on usage data of the service consumer device 108. For example, the modeler 112 may monitor data usage, text usage, or any other type of wireless usage. The modeler 112 may determine that the wireless usage exceeds or is approaching a threshold value. The modeler 112 may forecast the service request 113 in response to determination that the wireless usage exceeds and/or is approaching the threshold value.

The modeler 112 may include a machine learning framework 114. The machine learning framework 114 may include an application programing interface (API), a statistical model, a data structure, a database, procedural calls, and other tools used to train, test, validate. The machine learning framework 114 may provide metrics that are used to predict the service request 113. In some examples, the machine learning framework 114 may include a repository (not shown in FIG. 1) that stores metrics, coefficients, and/or procedures to apply machine learning to the service parameters.

In some examples, the machine learning framework 114 may create and manage a machine learning model. The machine learning model may include a statistical model generated based on a machine learning algorithm. The machine learning algorithm may include linear discriminant analysis, classification and regression trees, support vector machines, nearest neighbor, and/or any other supervised, unsupervised, and/or reinforcement learning. For example, the modeler 112 may supply the service parameters to the machine learning algorithm. The machine learning algorithm may be utilized to generate the machine learning model based on the service parameters. Alternatively or in addition, machine learning model may be generated on other information including, for example, historical service requests, user interaction with display interfaces, and/or any other information processed by the service authority 104.

The modeler 112 may provide a training set and/or a test set to the machine learning framework 114 to train a machine learning model. The training set may include data that is used to establish associations between service parameters. Alternatively or in addition, the training set may be used to generate and/or modify the machine learning model and/or information stored within the machine learning model. The training set may be applied to a machine learning algorithm to establish coefficients or other metrics used by the machine learning model to generate predictions for one or more service requests. Test data may be applied to the machine learning model to measure the quality of the machine learning model in terms of errors, precision, recall time, or any other measure of efficiency and correctness.

The service request 113 may include a request to create, modify, update, cancel, change, or otherwise influence the service. The service request 113 may include parameters, instructions, or other information that informs the service authority 104 how to administer the service. For example, service authority 104 may respond to receipt of the service request 113 by executing scripts, procedures, and other logic implicated by the service request 113 and/or parameters of the service request 113. In some examples, the request may be sent over a messaging service to multiple source systems. In one example, a request to activate service may be sent to both a billing system and to a network management system. The billing system may initiate billing processes for the service consumer device 108 and the network management system may enable wireless communication with the service consumer device 108.

In some examples, the service request 113 may be associated with a service account. The service account may include any account in which the service, or features of the service, are assigned. The account may be associated with a user, the consumer device 108, and/or any other consumer of the service. One or more of the source systems 106A-E and/or the service authority 104 may store information related to the service account including, for example, a unique identifier of the account and/or features assigned to the account. In one example, wireless service may provide various features including, for example, text messaging, voice, and data. Some features of the wireless service may be assigned to the service account while other features may not, depending on the level of service requested.

In some examples, the modeler 112 may generate a confidence metric corresponding to the service request 113. The confidence metric may include a probability, or other measurement that quantifies a statistical likelihood if a future occurrence. The confidence metric may include a confidence measurement that the service request 113 will be communicated to, received by, and/or processed by the service authority 104. Alternatively or in addition, the confidence metric may include a confidence measurement that the service request 113 will be associated with the service account. The machine learning framework 114 may generate the confidence based on the machine learning model and/or the machine learning algorithm.

The remediation node 102 may include a validator 116. The validator 116 may evaluate whether the service request 113 will generate an error when the service request 113 is processed. The error may include any malfunction, exception, or mistake generated or predicted to be generated by the service authority 104 and/or the source systems 106A-E. For example, the service authority 104 may execute scripts, procedural calls, and logic in response to the service authority. In some examples, the error may include an exception generated by execution of the scripts, procedure calls, and logic using information included in the service request 113.

There are numerous types of errors that can be generated by the service authority 104 and/or the source systems 106A-E. The error, or multiple errors, may be generated due to an error condition. An error condition may include the include logic, data, missing data, or any combination thereof that causes, or is predicted to cause, one or more errors. For example, data may be mismatched between systems. Mismatched data may be manifested when, for example, a first service parameter stored in a first one of the source systems 106A-E does not match, or otherwise correspond to, a second service parameter stored in a second one of the source systems 106A-E. Alternatively or in addition, the error condition may include missing data. For example, one or more of the source systems 106A-E may be missing service parameters utilized by the service authority 104 to process the service request 113. Alternatively or in addition, the error condition may include defective computer code and/or hardware used implemented by the service authority 104 and/or the source systems 106A-E.

In many examples, the error conditions may classified based on the type of service implemented. The Table 2 lists examples of the error conditions that may occur with, for example, managing wireless service.

TABLE 2

Example Error Conditions

Billing Account Number mismatch in CRM and Billing systems
MSISDN with missing Core Products (SIM, Promotion, Post-pay (data), service profile, Tariff)
Mismatched Account Number in CRM and Billing systems
IMSI mismatch in Inventory and CRM systems
CRM and Billing - Product Status Mismatch (i.e. Siebel or BRM are misaligned for at least one product)
ICCID or IMSI mismatch in CRM and Inventory management systems
MSISDN missing in one or more of Inventory - Billing - CRM - Network management systems
Mismatch of owner in CRM and Billing systems
UIM service state missing in inventory management system
Presence of middleware account, middleware billing account number, and/or middleware contact
Product mismatch in CRM and Billing systems
Product mismatch in CRM and Network management systems The examples listed in Table 2 are non-limiting examples of possible error conditions that may cause one or more errors when processing the service request 113. These examples are not intended to limit the types of error conditions and/or errors corresponding to processing the service request 113. It should be appreciated that the error may include any error that prohibits, hinders, or prevents the service authority 104 from properly processing the service request 113. The error condition, in general includes any circumstances that may cause, or are predicted to cause, the error.

In other examples, the error may include a failure to retrieve service parameters. For example, communication with one or more of the source systems 106A-E may be disrupted. Alternatively or in addition, software updates to the one or more source systems 106A-E may cause communication errors between service authority 104, which may operate on an outdated protocol.

The validator 116 may determine an error identifier 118. The error identifier 118 may represent the error condition. For example, the error identifier 118 may be descriptive of the error condition. In some examples, the error identifier 118 may include an error code, an error category, an exception, or any other type of information related to the error caused by the error condition. Alternatively or in addition, the error identifier 118 may include an identifier stored in the validation repository 120, machine learning framework 114, and/or the remediation repository 126. In some examples, the error identifier 118 may uniquely identify the error condition. The error identifier 118 may be mapped to other information in the machine learning framework, the validation repository and/or the remediation. For example, the error identifier 118 may be mapped to one or more instructions to remediate the error condition.

The validator 116 may access one or more source system to identify one or more of the service parameters used by the service authority 104 to process the service request 113. For example, the validator 116 may identify which service parameters are used to process the service request 113. Alternatively or in addition the validator 116 may identify the source systems 106A-E that store the service parameters used to process the service request 113.

In some examples, the validator 116 may include a validation repository 120. The validation repository 120 may be a hardware storage device that may include a database, a memory, or any other type of storage medium. The validation repository 120 may include validation logic. The validation logic may include predetermined logic that evaluates the service request 113 to determine errors that may be generated if the service request 113 is processed. The validation logic may determine the error identifier 118 of the error condition corresponding to the errors. Alternatively or in addition, the validation logic may identify the service parameters and/or the source systems 106A-E used to process the service request 113. Alternatively or in addition, the validation logic may include logic to access the source systems 106A-E, search the source systems 106A-E for the service parameters related to the service order, and/or simulate the processing of the service order.

In some examples, the validation repository 120 may include mappings between validation logic and various service requests. For example, the validation repository 120 may include a mapping between a validation logic identifier and the service request 113 or an identifier of the service request. In some examples, the service request 113 may be associated with a service request type. The service request type may include a categorization of the service request. The validator 116 may access the validation repository 120 to identify one or more mapping between validation logic and corresponding service request type. The validator 116 may perform and/or execute the validation logic to detect the error identifier 118 associated with the service request 113 and/or the performance of the service request 113.

The validator may also access the machine learning framework 114. For example, the machine learning framework 114 may forecast one or more errors that may occur. Alternatively or in addition, the machine learning framework 114 may identify patterns in the service parameters. For example, the machine learning framework 114 may identify a cluster of service parameters stored on the source systems 106A-E. Alternatively or in addition, the machine learning framework may identify an outlier service parameter relative to the cluster of service parameters. The validation logic may determine based on the cluster of parameters 114 and the outlier parameter that the there is an error condition associated with the outlier parameter.

In some examples, the machine learning framework 114 may be trained with previous errors and service parameters that caused the errors. The machine learning framework 114 may determine the error identifier 118 and one or more service parameters that are forecasted to cause the error associated with the error identifier 118. Alternatively or in addition, the machine learning framework 114 may provide an error confidence for the error identifier 118. The error confidence may include a measurement that that an error will occur. Alternatively or in addition, the error confidence may include a probability that the error condition is present in the service authority 104 and/or one or more of the source systems 106A-e.

The error identifier 118, the error confidence, and/or the service request 113 may be mapped to an account identifier. The account identifier may identify an account associated with a user, organization, device, or any other entity. The account identifier may include an account for the services managed by the service authority 104. The service authority 104 may assign features of the services to the account. The wireless authority may bill the account in accordance with the services provided under the account. In some examples, the service request 113 and/or the error identifier 118 may be predicted to be associated with the account.

The system 100 may further include a remediation engine 122. The remediation engine 122 may resolve error conditions. The remediation engine 122 may resolve an error condition based on the error identifier 118. The remediation engine 122 may communicate with the source systems 106A-E to correct various types of errors that may occur if the service request 113 were processed. For example, the remediation engine 122 may generate a remediation message. Receipt of the remediation message 124 by a source system may cause the source system to modify one or more the service parameters stored by the source system.

The remediation message 124 may include a message configured to communicate with the one or more source systems 106A-E. The remediation message may be configured with content that adheres to a protocol implemented on the one or more source systems 106A-E. In some examples, the remediation message may include an instruction to create, modify, and delete information stored in the one or more source systems 106A-E. Alternatively or in addition, the remediation message 124 may include an instruction to modify operation of the one or more source systems 106A-E. The remediation message may include a procedural call, an API call, SQL, HTML, XML, Javascript, and/or any other type of computer instructions.

In some examples, the remediation message 124 may be generated from one or more remediation instructions. A remediation instruction may include logic that communicates with the one or more source systems 106A-E to remediate one or more error conditions. The remediation instruction may include the procedures by which remediation is coordinated between one or more source systems 106A-E. The remediation instruction may include a script, logic, instructions, compiled machine code, and/or any other compliable or executable set of predefined instructions. The remediation instruction may be included in the remediation repository 126. The remediation instruction may generate one or more remediation messages. For example, the remediation instruction may include the scripts that generate SQL calls, API calls, procedural calls, REST messages. The remediation message may generate one or more remediation messages in accordance with the protocols implemented by one or more of the source systems 106A-E.

The remediation engine 122 may resolve an error condition based on the error identifier 118. For example, the remediation engine 122 may include a remediation repository 126. The remediation repository may include a database, a memory, a data structure, or any other type of information storage construct. In some examples, the remediation repository 126 may include associations between error identifiers and remediation logic. The remediation engine 122 may determine the remediation logic by identifying an association between the remediation logic and the error identifier 118. The remediation logic may include a script, procedure calls, or any other type of executable logic that communicates with one more of the source systems 106A-E. Alternatively or in addition, performance of the remediation logic may generate one or more remediation messages.

The remediation node 102 may include a display engine 128. The display engine 128 may generate one or more display interface 130. The display engine and/or the remediation node 102 may communicate the display interface 130 to a terminal device 110. Alternatively or in addition, the display engine 128 may receive input from the terminal device 110 regarding interactions with the display interface 130. The terminal device 110 may include any device in communication with the remediation node 102 including a laptop, a computer, a monitor, or any other type of device capable of displaying information. The terminal device 110 may communicate with the remediation node 102 though the network and/or through any other type of communication channel.

The display interface 130 may include information related to operation of modeler 112, the validator 116, and or the remediation engine 122. In some examples, the display interface 130 may include a plurality of display interfaces, each interface customized with particular information. In one example, the display interface 130 may display the error identifier 118 and/or descriptions of the source systems 106A-E. Alternatively or in addition, the display interface 130 may receive input indicative which remediation logic should be associated with the error identifier 118. For example, a user may select the remediation logic to map to the error identifier 118. Alternatively or in addition, the user may unmap the error identifier 118 from previously assigned remediation logic In some examples, the display engine 128 may generate content for the display interface 130 that includes one or more account identifier. One or more service requests, one or more error identifiers, one or more error confidences, one or more remediation instructions may be displayed with, or in proximity to, the account identifier. In some examples, the display engine may highlight information based on confidences of information forecasted by the modeler 112 and/or the validator 116. For example, the display interface 130 may color-code the account based on the error confidence. In one specific example, accounts information associated with an error confidence less than a first threshold value may be highlighted green. Account information associated with an error confidence between the first threshold and a second threshold may be highlighted yellow. Account information associated with an error confidence higher than the second threshold value may be highlighted red. Other examples of color coding may exist.

The remediation node 102 may include a notification engine 134. The notification engine 134 may communicate various information to the terminal device 110, the service consumer device 108, and/or other devices and/or users. The notification engine 134 may generate a notification message 136. The notification message 136 may include a notification of errors information, such as the error identifier 118. Alternatively or in addition, the notification message 136 may include remediation information such as the remediation message 124 or other suggested remediation actions determined by the remediation engine 122. Alternatively or in addition, the notification message 136 may include any message included in the display interface 130. In some examples, the notification message 136 may include a link that is configured to cause the terminal device 110 to load the display interface 130.

Using the system and methods described herein, a user and/or device may timely receive information related to errors that may be generated by the service request 113 before the service request 113 is actually processed. Since the modeler 112 predicts the service request 113, the error conditions correspond to the errors may be resolved before the service request 113 is communicated by a user and/or processed. Alternatively or in addition, the system improves efficiency by monitoring, detecting, and/or resolving errors that are likely to occur first.

Figure 2:
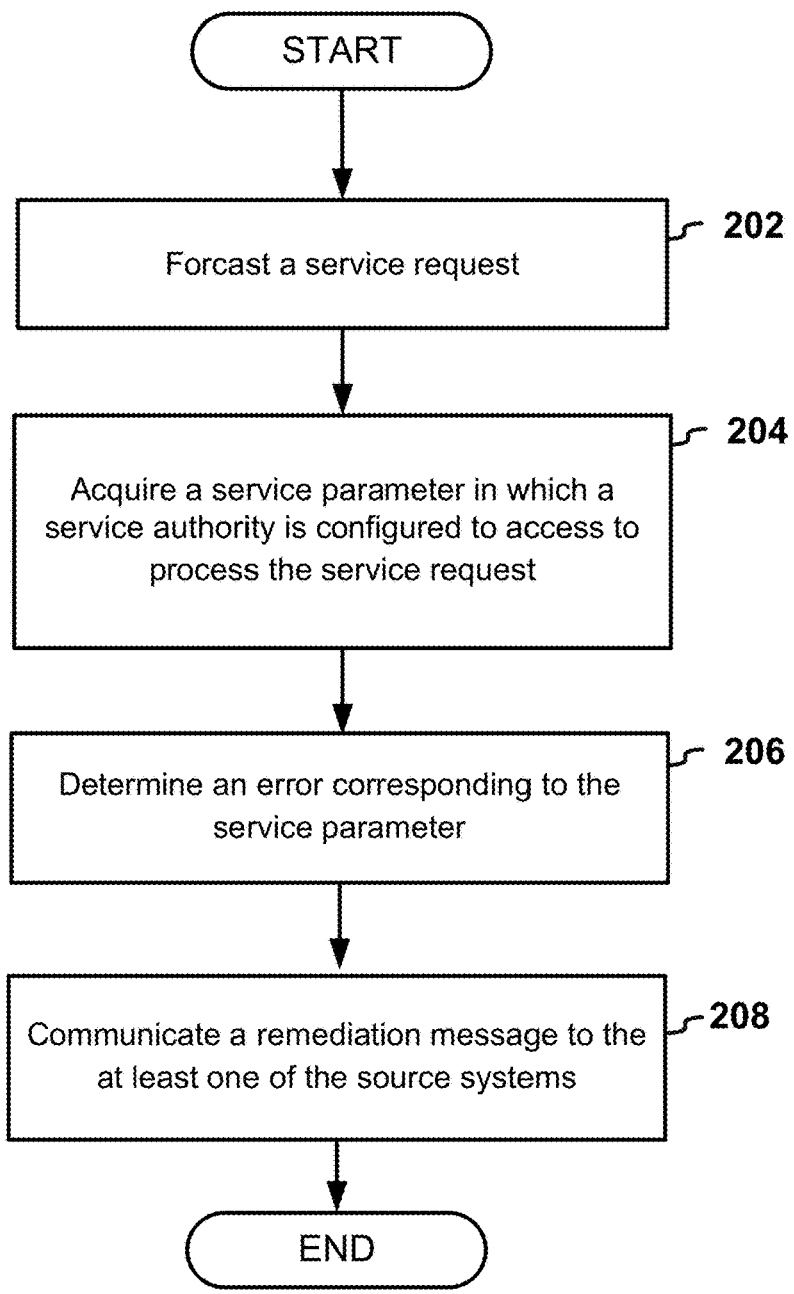
FIG. 2 illustrates an example of flow logic for a system.

FIG. 2 illustrates an example of flow logic for the system 100. The remediation node 102 may forecast the service request 113 (202). For example, the modeler 112 may forecast communication of the service request 113 to a service authority 104. Alternatively or in addition, the modeler 112 may forecast that the service request will be processed by the service authority 104. In some examples, the modeler 112 may forecast that the service request 113 will be associated with a particular service account and/or service consumer device 108. For example, the modeler 112 may determine that the service request 113 will be generated based on activity of a user registered under the service account.

The remediation node 102 acquire the service parameter in which the service authority 104 is configured to access to process the service request 113 (204). For example the validator 116 may identify, in the validation repository 120, predetermined validation logic associated with the service request. The predetermined validation logic may have been previously generated to validate the service request 113 or the service request type corresponding to the service request. The validator may execute the predetermined validation logic automatically in response to identification of the service request 113 and/or the predetermined validation logic.

The remediation node 102 may determine an error condition corresponding to the service parameter (206). For example, the validator 116 may execute the predetermined validation logic. The predetermined validation logic may cause the validator 116 to access one or more of the source systems 106A-E. The predetermined logic may cause the validator 116 to identify the service parameter used by the service authority 104 to process the service request 113. The validator 116 may determine that the service parameter is incorrect, compromised, mismatched, and/or not accessible.

The remediation node 102 may communicate a remediation message to at least one of the source systems 106(A-E) (208). For example, the remediation engine 112 may identify a mapping between the error identifier 118 and remediation logic included in the remediation repository 126. The remediation engine 122 may execute the remediation logic. The remediation logic may cause the remediation engine 122 to remediate the error condition. For example, the remediation logic may cause the remediation engine 122 to modify the service parameter that tis incorrect, compromised, and mismatched. The remediation logic may generate the remediation message 124. The remediation message 124 may include an instruction, command, or other information causes the one or more source system to create, modify, or delete the service parameter.

Figure 3:
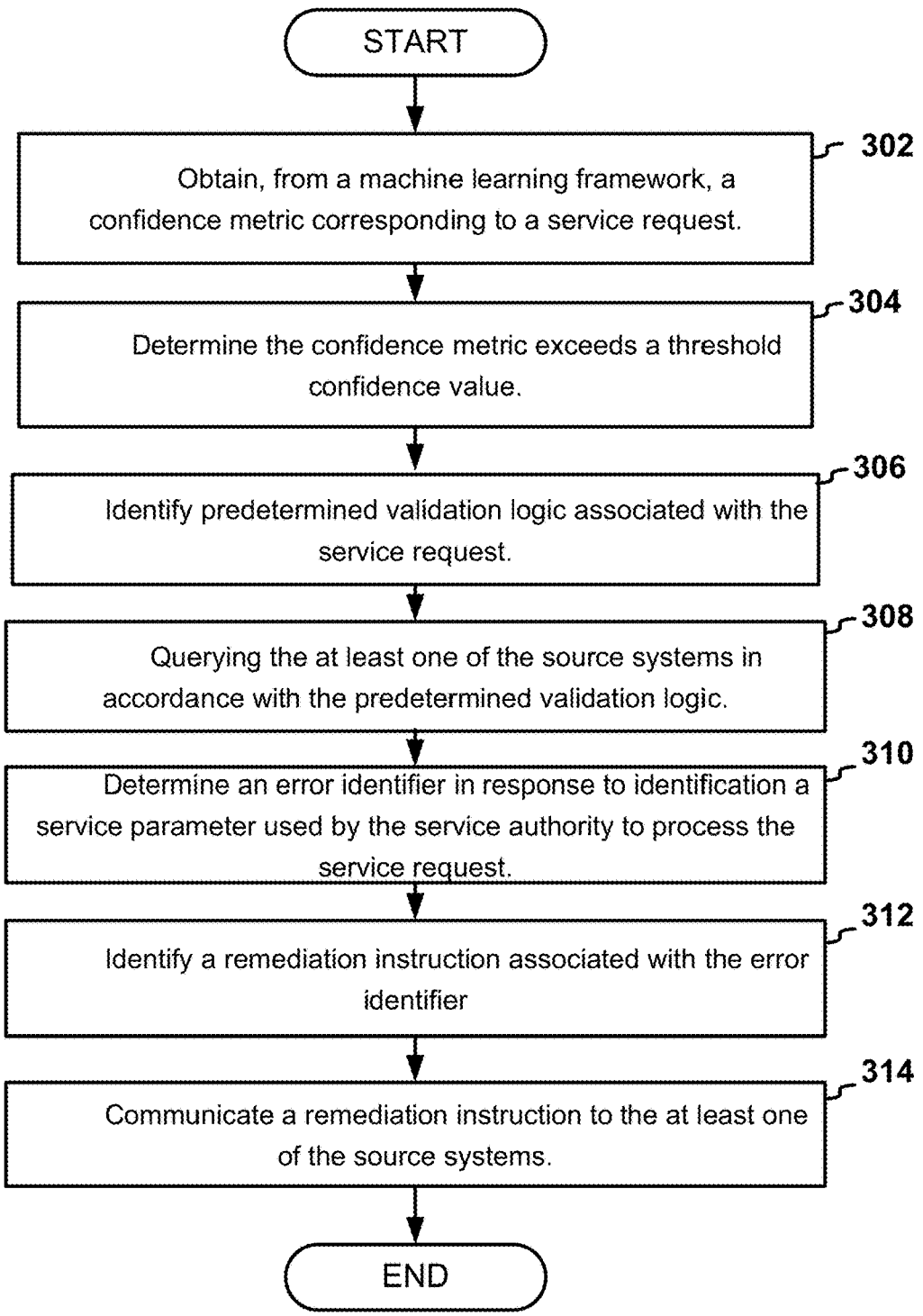
FIG. 3 illustrates a second example of flow logic for a system.

FIG. 3 illustrates a second example of flow logic for the system 100. The remediation node 102 may obtain, from the machine learning framework 114, a confidence metric corresponding to the service request 113 (302). The machine learning framework 114 may comprise, access, or utilize a machine learning model. The machine learning model may be previously trained based on a plurality of service parameters previously received from the source systems 106A-E.

The remediation node 102 may determine the confidence metric exceeds a threshold confidence value (304). The threshold confidence value may include a confidence level in which the remediation node 102 uses to trigger further evaluation of the service request 113. In some examples, the threshold confidence value may provide a method to prioritize which service requests should be evaluated and service requests should not. For example, it may be inefficient to monitor and correct error conditions corresponding to large quantities of service requests. The validator 116 may use the threshold confidence value to process service requests that have a relative high likelihood of being received by the service authority 104. The threshold confidence value may be tuned to account for the performance of the system 100, the amount of service parameters present in the source systems 106A-E, and/or other operational considerations. For example, a lower threshold confidence value may result in more error conditions being detected and/or remediated. On the contrary a higher threshold confidence value may result in less error conditions being remediated but higher operational efficiency.

In another example, the remediation engine 102 may obtain, from the machine learning framework 114, a plurality of confidence values representative of service requests being processed by the service authority 104. The remediation engine 102 may prioritize the services requests based on the confidence values and generate a prioritized set of service requests. The remediation engine 102 may select the service request from the prioritized set service requests. For example, the remediation engine may select the service request from a position in the set of prioritized set of service requests representative of the highest priority including, for example, the top or bottom of the list, depending on the prioritization. The prioritized set of service requests may include a list, a first-in-first-out queue, or any other type of data structure.

The remediation node 102 may identify predetermined validation logic associated with the service request 113 (306). As previously discussed, the predetermined validation logic may include logic configured to communicate with the source systems 106A-E, the service consumer device 108, and/or the service authority 104 to determine if the service request 113 will be successfully processed. For example, the predetermined validation logic may include an instruction to query the one or more source systems for a service parameter. The predetermined validation logic may be associated with the service request 113. For example, an identifier of the predetermined validation logic may be associated with an identifier of the service request 113. The validation repository 120 may include a plurality of mappings between predetermined validation logic and one or more service requests. In some examples, the validator 116 may receive the predetermined validation logic from, for example, the terminal device 110 or any other source. Alternatively or in addition, the validator 116 may identify the predetermined validation logic in the validation repository 120 based on the service request 113 and/or an identifier thereof.

The remediation node 102 may query at least one of the source systems 106A-E in accordance with the predetermined validation logic (308). For example, the predetermine validation logic may identify a source systems and/or the service parameters stored by the source system. The remediation node 102 may process, perform, and/or execute the validation logic to query the source system from the service parameters.

Determine an error condition in response to identification a service parameter used by the service authority 104 to process the service request. (310). For example, the remediation node 102 may identify the error identifier 118 associated with the error condition. In some examples, the error identifier 118 may be identified through execution of the validation logic. In some examples, the error identifier 118 may be associated to a remediation instruction and/or an identifier of the remediation instruction. For example, the remediation repository 126 may include a mapping between remediation instructions and errors.

The remediation node 102 may identify remediation logic associated with the error identifer (312). For example, the remediation engine 122 may query the remediation repository 126 for the remediation logic. The remediation logic may be mapped to the error identifier 118. The remediation engine 122 may generate the remediation message 124 based on the remediation logic. The remediation node 102 may communicate the remediation instruction to at least one of the source systems 106A-E (314).

Figure 4:
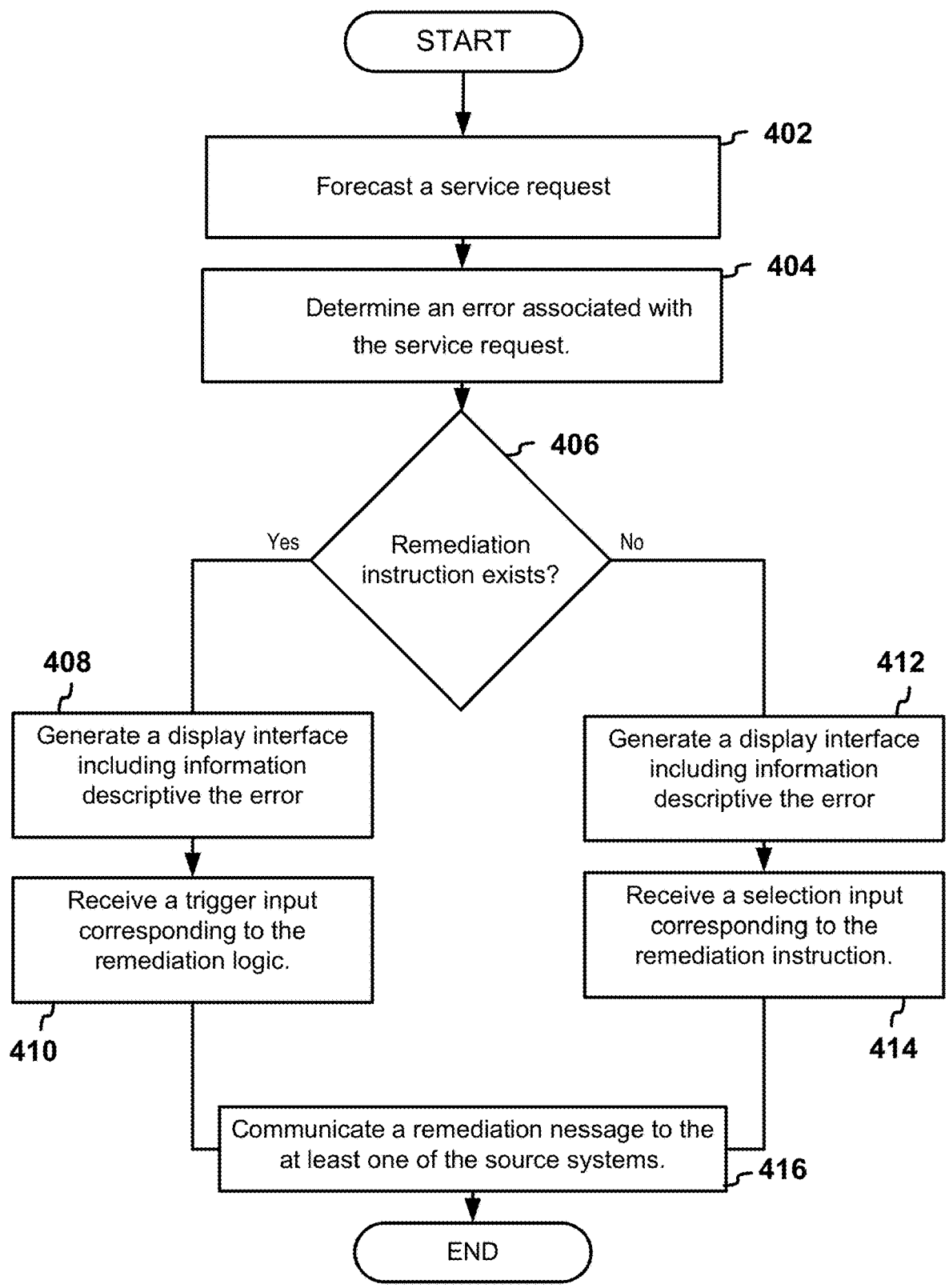
FIG. 4 illustrates a third example of flow logic for a system.

FIG. 4 illustrates a third example of flow logic for the system 100. The remediation node may forecast the service request 113 (402). Alternative or in addition, the remediation node may determine an error condition associated with the service request 113 (404). After the error condition has been identified, the remediation node 102 may perform operations to remediate the error condition.

The remediation node may determine whether the remediation instruction exists (406). For example, the remediation engine may determine whether the remediation repository 126 includes a mapping between the error condition and the remediation instruction.

In response to determination that the remediation instruction exists (406, yes), the remediation node 102 may generate the display interface 130 for displaying including information descriptive of the remediation logic and/or the error condition (408). The display interface 130 may include a button, label, or some other actionable trigger. In some examples, a device displaying the display interface 130 may communicate a section input corresponding to the error condition. The selecting input may indicate a trigger to start the remediation process.

The remediation node 102 may receive a trigger input corresponding to the remediation logic (410). For example, after a user selects the button, label, or other actionable trigger on the display interface 130, the remediation node may receive input that identifies the remediation logic. The input may include, for example, an identifier of the remediation logic store din the remediation repository 126

In response to determination that the remediation instruction does not exist (408, No), the remediation node 102 may generate the display interface 130 including information descriptive of the error condition (412). Alternatively or in addition, the display interface 130 may include a field configured to receive a predefined remediation instruction and/or an identifier of the predefined remediation instruction. For example, the display interface 130 may include identifiers corresponding multiple identifiers of remediation logic stored in the remediation repository. A user may select a remediation logic to associate with the error condition.

The remediation node 102 may receive a selection input corresponding the remediation instruction (414). For example, when the user interacts with the display interface 130, the display interface 130 may generate the selection input. The selection input may include an identifier of the remediation logic the user selected. The remediation engine may associate the remediation logic with the error condition in the remediation repository. The remediation engine may generate the mapping between one or more selected remediation instructions and the error condition.

The remediation node may communicate the remediation message 124 to the one or more source systems (416). The remediation message 124 may include or be generated from the remediation logic selected by the user.

Figure 5:
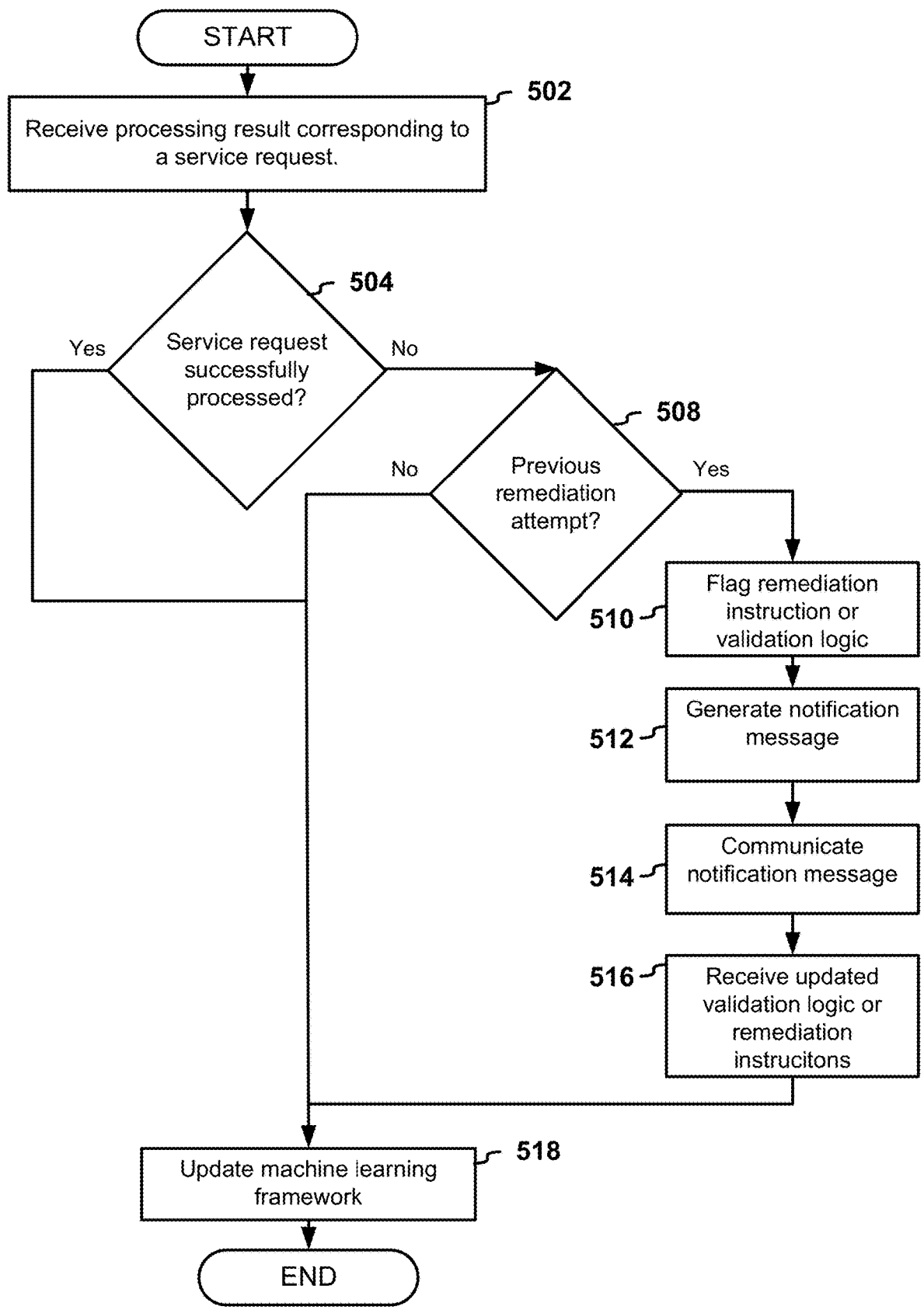
FIG. 5 illustrates a fourth example of flow logic for a system.

FIG. 5 illustrates a fourth example of flow logic for the system 100. The remediation node 102 may receive a processing result corresponding to the service request 113 (502). The processing result may include a notification of the actions the service authority took to process the request. For example, the service authority may receive the service request 113 and perform actions in response to the service request. For example, the service authority 104 may cause services, such as voice data or text, to be enabled or disabled in response to the service request. The processing result may include an indication of success or an indication of failure. For example, the processing result may include an error thrown by the service authority 104 and/or one or more of the source systems 106A-E.

The remediation node 102 determine whether the service request 113 was successfully processed (504). The remediation node may analyze the processing result to determine whether the service request 113 was successfully processed by the service authority 104. For example, the processing result may include an indication of an error or successful processing of the service request.

In response to determining that the service request 113 was not successfully processed (504, no), the remediation node may determine whether there was a previous remediation attempt (508). The remediation node 102 may determine whether the remediation node 102 forecasted the service request 113 being processed by the service authority 104. Alternatively or in addition, the remediation node 102 may identify the validation logic and/or the remediation instruction used to identify the error that occurred in response to processing the service request. Alternatively or in addition, the remediation node may identify the remediation instruction that was used to attempt to remediate the error condition for the error that caused the service request 113 to be unsuccessfully processed.

In response to determining that there was a previous remediation attempt (508, yes), the remediation node 102 may flag the remediation instruction and/or validation logic (510). For example, the remediation node 102 may identify the remediation instruction in the remediation repository 126. In some examples, the processing result received by the remediation node 102 may include an error identifier 118. The error identifier 118 may be included in the remediation repository 126. When the remediation instruction is used to remediate the error condition associated with the error identifier 118, the remediation instruction may be mapped to the error identifier 118. Accordingly, the remediation instruction may be queried in the remediation repository based on the error identifier 118.

The remediation node may generate the notification message 136 (512). The notification message 136 may include the display interface 130 and/or a link to load the display interface 130. For example, the display interface 130 may include a message indicating that the service request 113 failed processing by the service authority 104. Alternatively or in addition, the display interface 130 may include flagged mappings between one or more remediation instructions, the validation logic, and/or respective errors conditions. Alternatively or in addition, the notification may include any other display information described herein.

The notification engine may communicate the notification message 136 (514). For example, the notification engine may communicate the notification message 136 to the terminal device 110 and/or any other device.

The remediation node may receive updated validation logic or remediation instructions (516). For example, in response to determining that the remediation instruction did not cure an error condition, the remediation node may receive updated validation logic. The updated validation logic may include logic that has been updated after a user had the opportunity to evaluate the error and/or the error condition that caused the error. Alternatively or in addition, the remediation node may receive updated remediation instructions. For example, after a user has had the opportunity to evaluate the error, the user may select and/or update the remediation instruction used to cure the error condition corresponding to the error.

The remediation node may update the machine learning model (512). For example, the modeler 112 may update the machine learning framework 114 with an indication that the service request 113 actually occurred. The machine learning engine may increase the confidences associated with the service parameters used to predict the service request.

Figure 6:
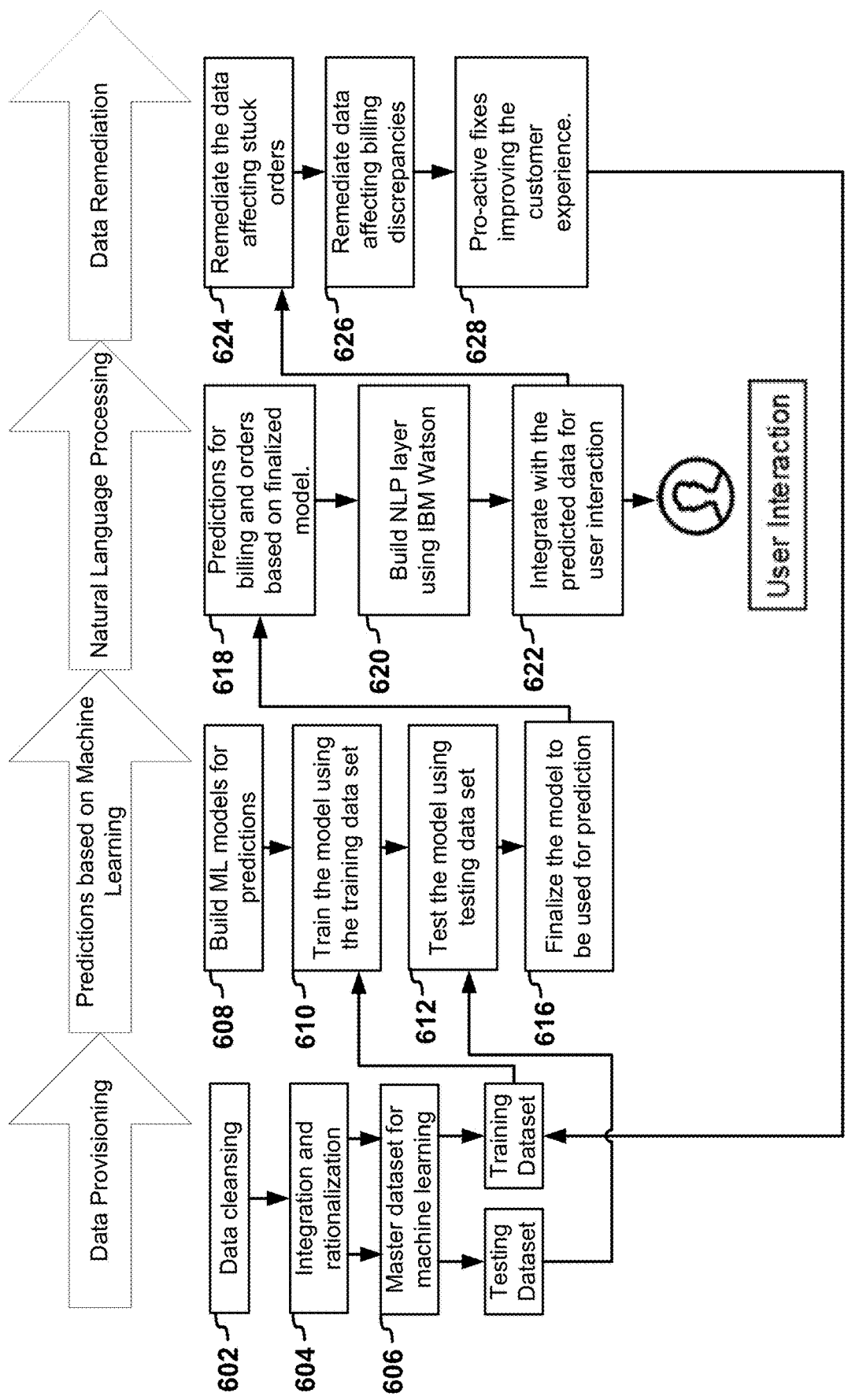
FIG. 6 illustrates an example of use case logic for a system.

FIG. 6 illustrates an example of use case logic for the system 100. At 602-604, the remediation logic may receive service parameters from the source systems 106A-E. The remediation node 102 may clean the service parameters (602). For example, the remediation node 102 may convert the service parameters between data types. Alternatively or in addition, the remediation node 102 may parse the information received from the source systems 106A-E. The remediation node 102 may integrate and rationalize the service parameters (604). For example, the remediation node 102 may prepare the data for a machine learning model. In some examples, service parameters are stored in multiple source systems and they have different relationships with other service parameters. The remediation node 102 may evaluate the same service parameter coming from different systems. The remediation node 102 may decide which one of the services parameters to feed into the machine learning algorithm. The remediation node may generate a master data set for machine learning 606. The master data set may include a testing data set and a training data set.

At 608-616, the remediation node 102 may build and manage machine learning models. For example, the machine learning framework 114 may build machine learning models for prediction using PYTHON, or some programming instruction set (608). The remediation node 102 may train the machine learning model using the training data set (610). Alternatively or in addition, the remediation node 102 may test the model using the testing data set (612). In some examples, the remediation node 102 may finalize the model (616). For example, the remediation node 102 may identify which one of a plurality of machine learning algorithms provides the maximum accuracy. To identify the best suited machine learning algorithm, the remediation node 102 may test known and established machine learning algorithms and ultimately select one which provides maximum accuracy in our prediction results.

At 618-622, the remediation node 102 may generate forecast service requests based on the machine learning framework 114. For example, the radiation node may predict orders based on the finalized model (618). In some examples, the machine learning model may build a natural language processing layer (620). The natural language processing layer may include text that is included in one or more display interface to display the results of the machine learning model and/or the remediation node 102. The natural language processing may occur using IBM WATSON, or some other natural language processer API. The remediation node 102 may integrate the information provided by the modeler 112, the validator 116, and/or the remediation engine 122 into the display interface 130 for display (622).

At 624-626, the remediation node 102 may remediate service parameters affecting stuck orders or other errors identified by the remediation node 102 (624). For example, the validator 116 may identify stuck orders and/or other errors. The remediation engine 122 may remediate the service parameters causing the stuck orders or the service parameters that are predicted to cause the stuck orders (626). Alternatively or in addition, the remediation engine 122 may remediate the service parameters causing or predicted to cause billing discrepancies (626). Alternatively or in addition, the remediation engine 122 may remediate any error conditions based on forecasted orders that will affect the customer experience in accessing, utilizing, and/or paying for the service (628).

Figure 7:
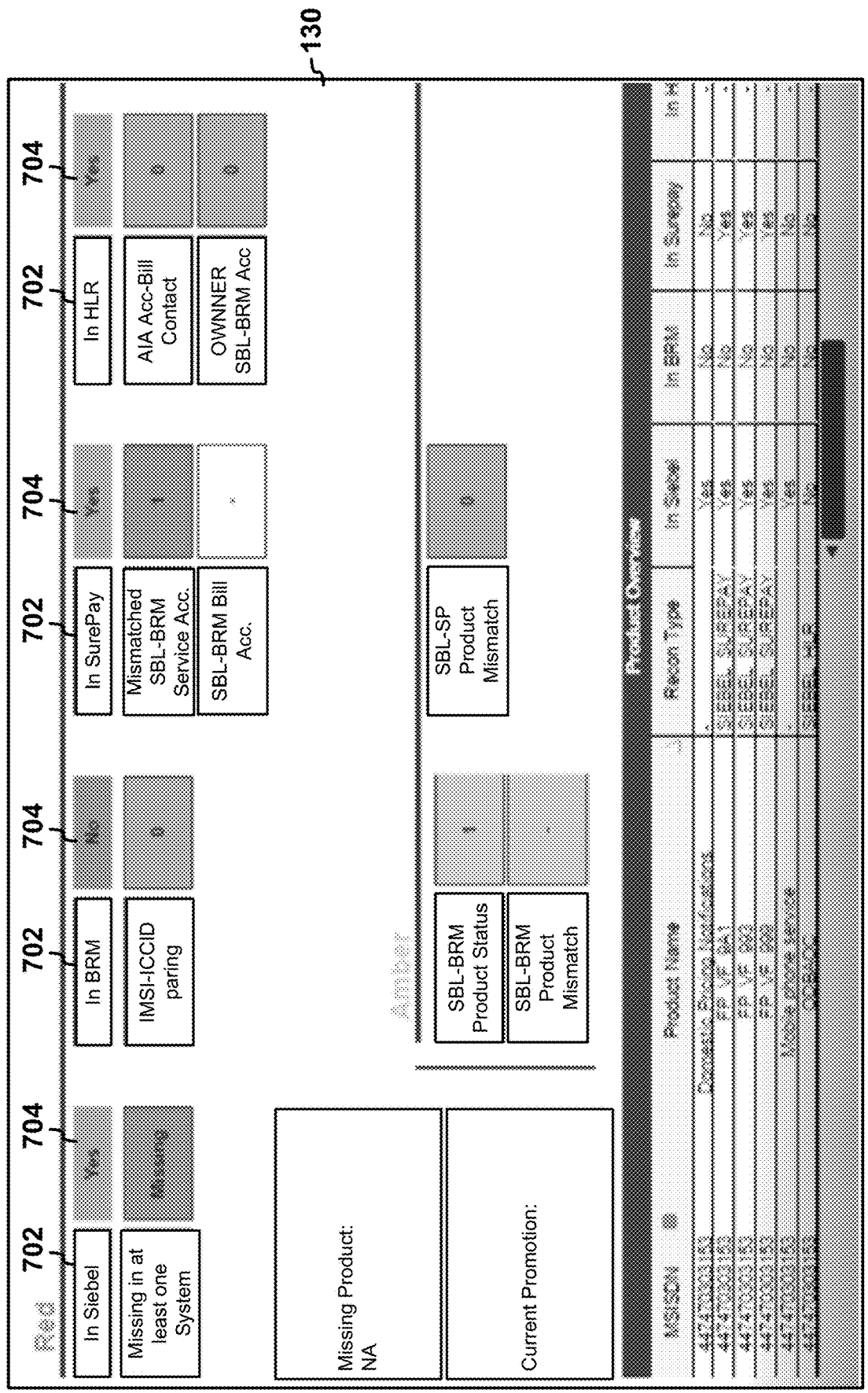
FIG. 7 illustrates an example of the display interface for the system.

FIG. 7 illustrates an example of the display interface 130 for the system 100. In some examples, the display interface 130 may include a source indicator 702. The source indicator 702 may correspond to one or more of the source systems 106A-E, described in reference to FIG. 1. Alternatively or in addition, the remediation node 102 may include, on the display interface 130, an error indicator 704 corresponding to an error identified and/or forecasted, as previously described. The error indicator 704 may include any information descriptive of the error condition. For example, the error indicator 704 may identify in which source system 106A-E the error occurred, or is forecasted to occur. Alternatively or in addition, the error indicator 704 may identify the cause of the error condition.

The remediation node may associate, on the display interface 130, the more error indicator 704 with the source indicator 702. For example, an error indicator 704 may be located in proximity to the source indicator 702. In some examples, the display interface 130 may visually indicate the error indicator 704 and source indicator 702 depending on the error condition. For example, when an error is detected or forecasted, the remediation node 102 may highlight the error indicator 704 and/or the source indicator 702 red. Alternatively or in addition, the remediation node 102 may highlight the error indicator 704 and/or source indicator 702 green when the error is not detected. In other examples, the color coding may be any range of colors depending on error confidences associated with the error, as previously described in reference to FIG. 1.

Figure 8:
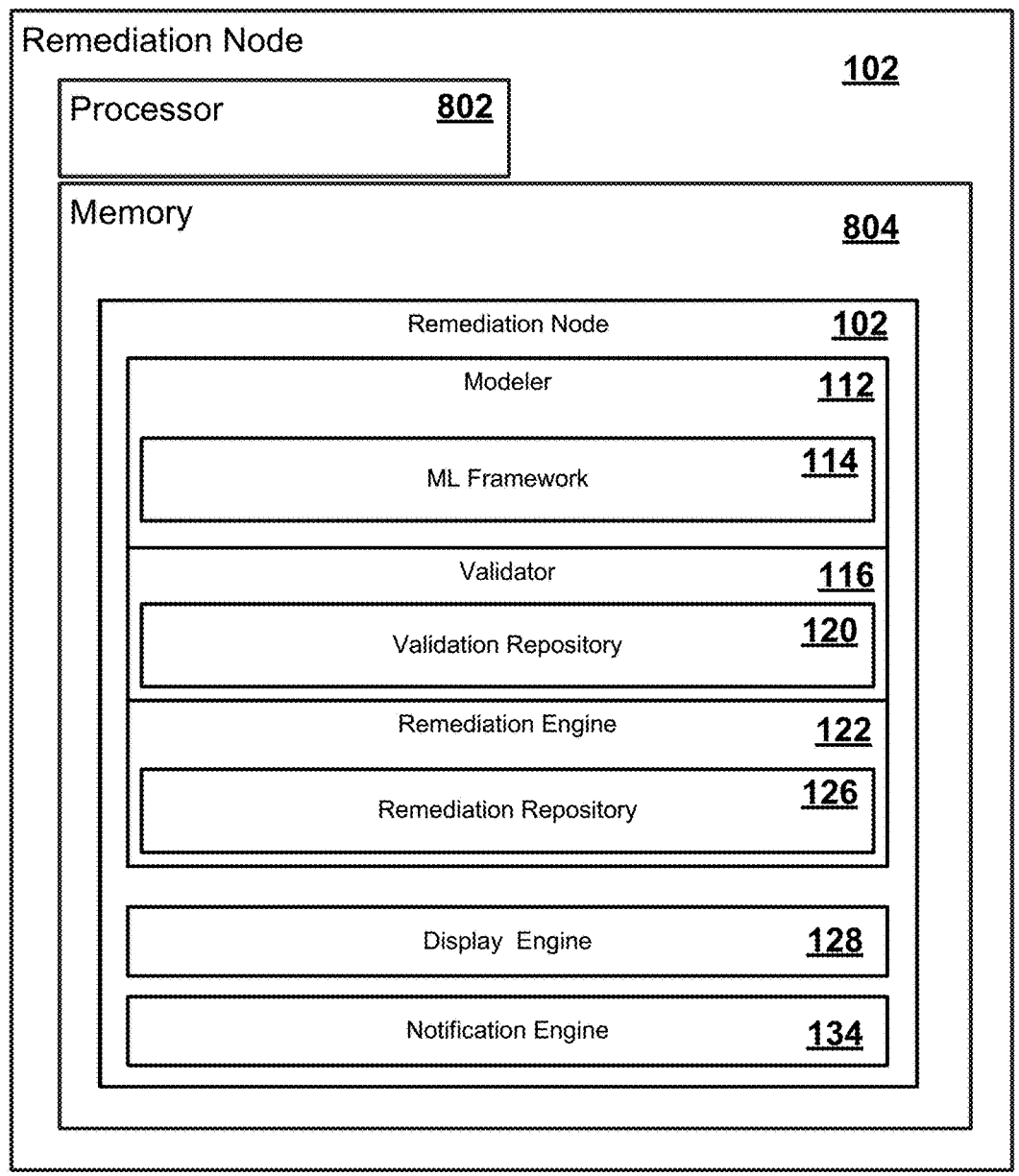
FIG. 8 illustrates a second example of a remediation node.

The system 100 and/or the remediation node 102 may be implemented with additional, different, or fewer components than described in reference to FIGS. 1-7. FIG. 8 illustrates an example of the remediation node 102 that includes a memory 804 and a processor 802.

The processor 802 may be in communication with the memory 804. In one example, the processor 802 may also be in communication with additional elements, such as a network interface (not shown). Examples of the processor 802 may include a general processor, a central processing unit, a microcontroller, a server, an application specific integrated circuit (ASIC), a digital signal processor, a field programmable gate array (FPGA), and/or a digital circuit, analog circuit, or some combination thereof.

The processor 802 may be one or more devices operable to execute logic. The logic may include computer executable instructions or computer code stored in the memory 804 or in other memory that when executed by the processor 802, cause the processor 802 to perform the features implemented by the logic of the remediation node 102, the modeler 112, the validator 116, the remediation engine 122, the display engine 128, the notification engine 134, the machine learning framework 114, the validation repository 120, the remediation repository 126 and/or the remediation node 102. The computer code may include instructions executable with the processor 802.

The memory 804 may be any device for storing and retrieving data or any combination thereof. The memory 804 may include non-volatile and/or volatile memory, such as a random access memory (RAM), a read-only memory (ROM), an erasable programmable read-only memory (EPROM), or flash memory. Alternatively or in addition, the memory 804 may include an optical, magnetic (hard-drive) or any other form of data storage device.

The memory 804 may include at least one remediation node 102, modeler 112, validator 116, remediation engine 122, display engine 128, notification engine 134, source systems 106A-B, machine learning framework 114, validation repository 120, and/or remediation repository 126. In addition, the memory may include any other component previously discussed, such as the service parameters, the remediation instructions, the remediation logic, the machine learning model, the machine learning algorithms, and/or other components of the system 100 described herein.

The remediation node 102 may be implemented in many different ways. For example each component of the system may include a circuit or circuitry. Each circuit or circuitry may be hardware or a combination of hardware and software. The circuitry may include the remediation node 102, the modeler 112, the validator 116, the remediation engine 122, the display engine 128, the notification engine 134, the machine learning framework 114, the validation repository 120, the remediation repository 126, and/or other components and subcomponents of the system 100 described herein. For example, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the memory 804, for example, that comprises instructions executable with the processor 802 or other processor to implement one or more of the features of the circuitry. When any one of the circuitry includes the portion of the memory that comprises instructions executable with the processor 802, the circuitry may or may not include the processor 802. In some examples, each circuitry may just be the portion of the memory 804 or other physical memory that comprises instructions executable with the processor 802 or other processor to implement the features of the corresponding circuitry without the circuitry including any other hardware. Because each circuitry includes at least some hardware even when the included hardware comprises software, each circuitry may be interchangeably referred to as a hardware circuitry.

Some features are shown stored in a computer readable storage medium (for example, as logic implemented as computer executable instructions or as data structures in memory). All or part of the remediation node 102 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the remediation node 102 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the remediation node 102 or remediation nodes may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A computer-implemented method, comprising:
    forecasting receipt of a service request by a service authority, the service authority configured to communicate with a plurality of source systems to process the service request;
    acquiring, from at least one of the source systems, a service parameter that the service authority is configured to access to process the service request, the service parameter stored by the at least one of the source systems;
    determining an error condition corresponding to the service parameter; and
    communicating, in response to determination of the error condition, a remediation message to the at least one of the source systems, the remediation message configured to cause the at least one of the source systems to modify the service parameter to resolve the error condition.

2. The computer-implemented method of aspect 1, wherein the step of forecasting further comprises:
    obtaining, from a machine learning framework, a confidence metric representative of an association between the service request and a service account managed by the service authority; and
    determining the confidence metric exceeds a threshold confidence metric.

3. The computer-implemented method of any of aspects 1 to 2, wherein the step of determining the error condition further comprises:
    comparing a first service parameter received from a first source system to a second service parameter received from a second source system; and
    selecting an error identifier from a database based on comparison of the first service parameter to the second service parameter, the error identifier corresponding to the error condition.

4. The computer-implemented method of any of aspects 1 to 3, further comprising:
    determining the error condition is associated with a remediation instruction stored in a repository, the remediation instruction comprising at least one instruction to modify the service parameter stored in the at least one of the source systems; and
    generating, based on the remediation instruction, the remediation message.

5. The computer-implemented method of any of aspects 1 to 4, further comprising
    determining that the error condition is not mapped to a remediation instruction in a remediation database configured to store mappings between error conditions and respective remediation instructions;
    receiving an input message indicative of at least one of the respective remediation instructions; and
    generating, in response to receipt of the input message, a mapping between the error condition and the at least one of the respective remediation instructions.

6. The computer-implemented method of any of aspects 1 to 5, wherein the step of communicating further comprises:
    communicating, to a terminal device, a display interface comprising a description of the error condition and a label corresponding to a remediation instruction;
    receiving a selection input directed at the label;
    generating based on the remediation instruction, the remediation message; and
    communicating the remediation message to the at least one of the source systems.

7. The computer-implemented method of any of aspects 1 to 6, wherein the step of forecasting further comprises:
    generating, in response to determination of the error condition, a notification message comprising a link configured to request a display interface, the display interface comprising a description of the error condition; and
    communicating the link to a terminal device.

8. A system, comprising:
    a processor, the processor configured to:
    forecast receipt of a service request by a service authority, the service authority configured to communicate with a plurality of source systems to process the service request;

acquire, from at least one of the source systems, a service parameter that the service authority is configured to access to process the service request, the service parameter stored on the at least one of the source systems;
determine an error condition corresponding to the service parameter; and
communicate, in response to determination of the error condition, a remediation message to the at least one of the source systems, the remediation message configured to cause the at least one of the source systems to modify the service parameter.

9. The system of aspect 8, wherein to forecast receipt of the service request, the processor is further configured to:
obtain, from a machine learning framework, a plurality of confidence values representative of service requests being received by the service authority;
prioritize the services requests based on the confidence values; and
select the service request from the prioritized service requests.

10. The system of any of aspects 8 to 9, wherein the processor is further configured to:
detect that an error corresponding to the error condition occurred in response to the service authority processing the service request; and
flag, in a remediation repository, a remediation instruction previously used to remediate the error condition.

11. The system of any of aspects 8 to 10, wherein the processor is further configured to
detect, after the remediation message is communicated, that an error corresponding to the error condition occurred in response to the service authority processing the service request; and
communicate, in response to detection that the error occurred, a notification message comprising an error identifier corresponding to the error condition.

12. The system of any of aspects 8 to 11, wherein the processor is further configured to
identify, in a repository, predetermined validation logic associated with the service request, the predetermined validation logic comprising an instruction to query the at least one of the source systems for the at least one of the service parameters, wherein acquiring the at least one of the service parameters further comprises querying the at least one of the source systems in accordance with the predetermined validation logic.

13. The system of any of aspects 8 to 12, wherein the processor is further configured to
identify, in a repository, predetermined validation logic associated with the service request, the predetermined validation logic comprising an instruction to validate at least one of the service parameters, wherein determining the error condition further comprises evaluating the at least one of the service parameters according to the predetermined validation logic.

14. The system of any of aspects 8 to 13, wherein the processor is further configured to
generate an error confidence comprising a measure that the service authority generates an error corresponding to the error condition in response to the service request;
generate a display interface comprising a description of the error condition, the description visually indicated with a color based on the error confidence; and
communicate the display interface to a terminal device.

15. A non-transitory computer readable storage medium, comprising a plurality of instructions executable by a processor, the instructions comprising instructions executable to forecast receipt of a service request by a service authority, the service authority configured to communicate with a plurality of source systems to process the service request;
instructions executable to acquire, from at least one of the source systems, a service parameter that the service authority is configured to access to process the service request;
instructions executable to determine an error condition corresponding to the service parameter; and
instructions executable to communicate, in response to determination of the error condition, a remediation message to the at least one of the source systems, the remediation message configured to cause the at least one of the source systems to modify the service parameter.

16. The non-transitory computer readable storage medium of aspect 15, wherein the instructions executable by the processor to forecast the service request further comprise:
instructions executable by the processor to obtain, from a machine learning framework, a plurality of confidence values representative of service requests being processed by the service authority;
instructions executable by the processor to prioritize the services requests based on the confidence values and generate a prioritized list of service requests; and
instructions executable by the processor to select the service request from a position in the prioritized list of service requests representative of a highest priority.

17. The non-transitory computer readable storage medium of any of aspects 15 to 16, further comprising,
instructions executable by the processor to detect that an error corresponding to the error condition occurred in response to the service authority processing the service request; and
instructions executable by the processor to flag, in a remediation repository, a mapping between an identifier of the error condition an identifier of a remediation instruction previously used to remediate the error condition.

18. The non-transitory computer readable storage medium of any of aspects 15 to 17, wherein the instructions executable by the processor to determine the error condition further comprise:
instructions executable by the processor to compare a first service parameter received from a first source system to a second service parameter received from a second source system; and
instructions executable by the processor to select an error identifier from a repository based on comparison of the first service parameter to the second service parameter.

19. The non-transitory computer readable storage medium of any of aspects 15 to 18, further comprising,
instructions executable by the processor to generate an error confidence comprising an probability that the service authority generates an error in response to the service request;
instructions executable by the processor to generate a display interface comprising a description of the error, the description visually indicated with a color based on the error confidence; and
instructions executable by the processor to communicate the display interface to a terminal device.

20. The non-transitory computer readable storage medium of any of aspects 15 to 19, further comprising,
instructions executable by the processor to determine the error condition is associated with a remediation instruction in a repository, the remediation instruction comprising at least one instruction to modify the service parameter stored on at least one of the source systems; and instructions executable by the processor to generate, based on the remediation instruction, the remediation message.

What is claimed is:

1. A computer-implemented method, comprising:
   forecasting receipt of a service request by a service authority, the service authority configured to communicate with a plurality of source systems to process the service request, the forecasting comprising:
   obtaining, from a machine learning framework, a plurality of confidence values representative of service requests being received by the service authority,
   prioritizing the services requests based on the confidence values, and selecting the service request from the prioritized service requests;
   acquiring, from at least one of the source systems, a service parameter that the service authority is configured to access to process the service request, the service parameter stored by the at least one of the source systems;
   determining an error condition corresponding to the service parameter; and
   communicating, in response to determination of the error condition, a remediation message to the at least one of the source systems, the remediation message configured to cause the at least one of the source systems to modify the service parameter to resolve the error condition.

2. The computer-implemented method of claim 1, wherein the step of forecasting further comprises:
   determining the confidence metric of the selected service request exceeds a threshold confidence metric.

3. The computer-implemented method of claim 1, wherein the step of determining the error condition further comprises:
   comparing a first service parameter received from a first source system to a second service parameter received from a second source system; and
   selecting an error identifier from a database based on comparison of the first service parameter to the second service parameter, the error identifier corresponding to the error condition.

4. The computer-implemented method of claim 1, further comprising:
   determining the error condition is associated with a remediation instruction stored in a repository, the remediation instruction comprising at least one instruction to modify the service parameter stored in the at least one of the source systems; and
   generating, based on the remediation instruction, the remediation message.

5. The computer-implemented method of claim 1, further comprising
   determining that the error condition is not mapped to a remediation instruction in a remediation database configured to store mappings between error conditions and respective remediation instructions;
   receiving an input message indicative of at least one of the respective remediation instructions; and
   generating, in response to receipt of the input message, a mapping between the error condition and the at least one of the respective remediation instructions.

6. The computer-implemented method of claim 1, wherein the step of communicating further comprises:
   communicating, to a terminal device, a display interface comprising a description of the error condition and a label corresponding to a remediation instruction;
   receiving a selection input directed at the label;
   generating based on the remediation instruction, the remediation message; and
   communicating the remediation message to the at least one of the source systems.

7. The computer-implemented method of claim 1, wherein the step of forecasting further comprises:
   generating, in response to determination of the error condition, a notification message comprising a link configured to request a display interface, the display interface comprising a description of the error condition; and
   communicating the link to a terminal device.

8. A remediation node, comprising:
   a processor, the processor configured to:
   forecast receipt of a service request by a service authority, the service authority configured to communicate with a plurality of source systems to process the service request, wherein to forecast receipt of the service request, the processor is further configured to obtain, from a machine learning framework, a confidence value representative of the service request being received by the service authority, and select the service request in response to the confidence value being greater than a threshold value;
   acquire, from at least one of the source systems, a service parameter that the service authority is configured to access to process the service request, the service parameter stored on the at least one of the source systems;
   determine an error condition corresponding to the service parameter; and
   communicate, in response to determination of the error condition, a remediation message to the at least one of the source systems, the remediation message configured to cause the at least one of the source systems to modify the service parameter.

9. The system of claim 8, wherein the processor is further configured to:
   detect that an error corresponding to the error condition occurred in response to the service authority processing the service request; and
   flag, in a remediation repository, a remediation instruction previously used to remediate the error condition.

10. The system of claim 9, wherein the processor is further configured to
    detect, after the remediation message is communicated, that an error corresponding to the error condition occurred in response to the service authority processing the service request; and
    communicate, in response to detection that the error occurred, a notification message comprising an error identifier corresponding to the error condition.

11. The system of claim 8, wherein the processor is further configured to identify, in a repository, predetermined validation logic associated with the service request, the predetermined validation logic comprising an instruction to query the at least one of the source systems for the at least one of the service parameters, wherein acquiring the at least one of the service parameters further comprises querying the at least one of the source systems in accordance with the predetermined validation logic.

12. The system of claim 8, wherein the processor is further configured to identify, in a repository, predetermined validation logic associated with the service request, the predetermined validation logic comprising an instruction to validate at least one of the service parameters, wherein determining the error condition further comprises evaluating the at least one of the service parameters according to the predetermined validation logic.

13. The system of claim 8, wherein the processor is further configured to
generate an error confidence comprising a measure that the service authority generates an error corresponding to the error condition in response to the service request;
generate a display interface comprising a description of the error condition, the description visually indicated with a color based on the error confidence; and
communicate the display interface to a terminal device.

14. A non-transitory computer readable storage medium, comprising a plurality of instructions executable by a processor, the instructions comprising
instructions executable to forecast receipt of a service request by a service authority, the service authority configured to communicate with a plurality of source systems to process the service request, the instruction executable to forecast receipt of the service request by the surface authority further comprising:
instructions executable to obtain, from a machine learning framework, a plurality of confidence values representative of service requests being processed by the service authority,
instructions executable to prioritize the services requests based on the confidence values and generate a prioritized list of service requests, and
instructions executable by to select the service request from a position in the prioritized list of service requests representative of a highest priority;
instructions executable to acquire, from at least one of the source systems, a service parameter that the service authority is configured to access to process the service request;
instructions executable to determine an error condition corresponding to the service parameter; and
instructions executable to communicate, in response to determination of the error condition, a remediation message to the at least one of the source systems, the remediation message configured to cause the at least one of the source systems to modify the service parameter.

15. The non-transitory computer readable storage medium of claim 14, further comprising,
instructions executable by the processor to detect that an error corresponding to the error condition occurred in response to the service authority processing the service request; and
instructions executable by the processor to flag, in a remediation repository, a mapping between an identifier of the error condition an identifier of a remediation instruction previously used to remediate the error condition.

16. The non-transitory computer readable storage medium of claim 14, wherein the instructions executable by the processor to determine the error condition further comprise:
instructions executable by the processor to compare a first service parameter received from a first source system to a second service parameter received from a second source system; and
instructions executable by the processor to select an error identifier from a repository based on comparison of the first service parameter to the second service parameter.

17. The non-transitory computer readable storage medium of claim 14, further comprising,
instructions executable by the processor to generate an error confidence comprising an probability that the service authority generates an error in response to the service request;
instructions executable by the processor to generate a display interface comprising a description of the error, the description visually indicated with a color based on the error confidence; and
instructions executable by the processor to communicate the display interface to a terminal device.

18. The non-transitory computer readable storage medium of claim 14, further comprising,
instructions executable by the processor to determine the error condition is associated with a remediation instruction in a repository, the remediation instruction comprising at least one instruction to modify the service parameter stored on at least one of the source systems; and
instructions executable by the processor to generate, based on the remediation instruction, the remediation message.

\* \* \* \* \*